United States Patent
Barzel et al.

(10) Patent No.: US 8,707,152 B2
(45) Date of Patent: Apr. 22, 2014

(54) PRESENTING IMAGES FROM SLOW IMAGE-EVENT STREAM

(75) Inventors: Ron Barzel, Truckee, CA (US); Jon Allyn Campbell, Oakland, CA (US); Ronald Steven Cok, Rochester, NY (US); Mark S. Cook, Greenbrae, CA (US)

(73) Assignee: Apple Inc., Cupertino, CA (US)

( * ) Notice: Subject to any disclaimer, the term of this patent is extended or adjusted under 35 U.S.C. 154(b) by 122 days.

(21) Appl. No.: 13/351,547

(22) Filed: Jan. 17, 2012

(65) Prior Publication Data

US 2013/0185635 A1    Jul. 18, 2013

(51) Int. Cl.
*G06F 17/00* (2006.01)

(52) U.S. Cl.
USPC ............................ 715/202; 715/205; 715/273

(58) Field of Classification Search
USPC ......... 715/200, 201, 202, 203, 205, 207, 209, 715/226, 234, 255, 256, 273, 730, 732, 756, 715/760, 763
See application file for complete search history.

(56) References Cited

U.S. PATENT DOCUMENTS

| | | | | |
|---|---|---|---|---|
| 6,606,411 | B1 * | 8/2003 | Loui et al. | 382/224 |
| 6,865,297 | B2 * | 3/2005 | Loui et al. | 382/224 |
| 7,035,467 | B2 | 4/2006 | Nicponski | |
| 7,058,721 | B1 * | 6/2006 | Ellison et al. | 709/231 |
| 7,366,994 | B2 * | 4/2008 | Loui | 715/764 |
| 7,730,036 | B2 * | 6/2010 | Blose et al. | 707/661 |
| 8,286,070 | B2 * | 10/2012 | Merril et al. | 715/203 |
| 2002/0075322 | A1 * | 6/2002 | Rosenzweig et al. | 345/835 |
| 2004/0125128 | A1 | 7/2004 | Chang et al. | |
| 2006/0036960 | A1 * | 2/2006 | Loui | 715/764 |
| 2007/0008321 | A1 * | 1/2007 | Gallagher et al. | 345/473 |
| 2007/0043792 | A1 | 2/2007 | O'Brien | |
| 2007/0173699 | A1 * | 7/2007 | Mathan et al. | 600/300 |
| 2008/0288523 | A1 * | 11/2008 | Blose et al. | 707/102 |
| 2009/0051826 | A1 | 2/2009 | Chang | |
| 2009/0307602 | A1 | 12/2009 | Brewer et al. | |
| 2010/0328465 | A1 * | 12/2010 | Merril et al. | 348/159 |
| 2011/0069179 | A1 | 3/2011 | Bathiche et al. | |
| 2011/0123124 | A1 | 5/2011 | Peters | |
| 2012/0047421 | A1 * | 2/2012 | Holman | 715/202 |

FOREIGN PATENT DOCUMENTS

WO    2008/156558    12/2008

* cited by examiner

*Primary Examiner* — Maikhanh Nguyen
(74) *Attorney, Agent, or Firm* — Wong, Cabello, Lutsch, Rutherford & Brucculeri, LLP

(57) ABSTRACT

A method of dynamically presenting temporally ordered image events includes providing a pre-determined presentation rate and a corresponding pre-determined presentation period; using a processor to receive at irregular intervals a plurality of temporally ordered image events at an average image event rate less than the presentation rate; storing the received image events in an ordered list corresponding to the order in which the image events were received; accessing, according to a pre-determined rule, stored image events from the ordered list; sequentially presenting the accessed image events for the presentation period; and interrupting the sequential presentation of the stored image events when a new image event is received and presenting the received new image event for the presentation period and resuming the sequential presentation of the accessed image events.

20 Claims, 10 Drawing Sheets

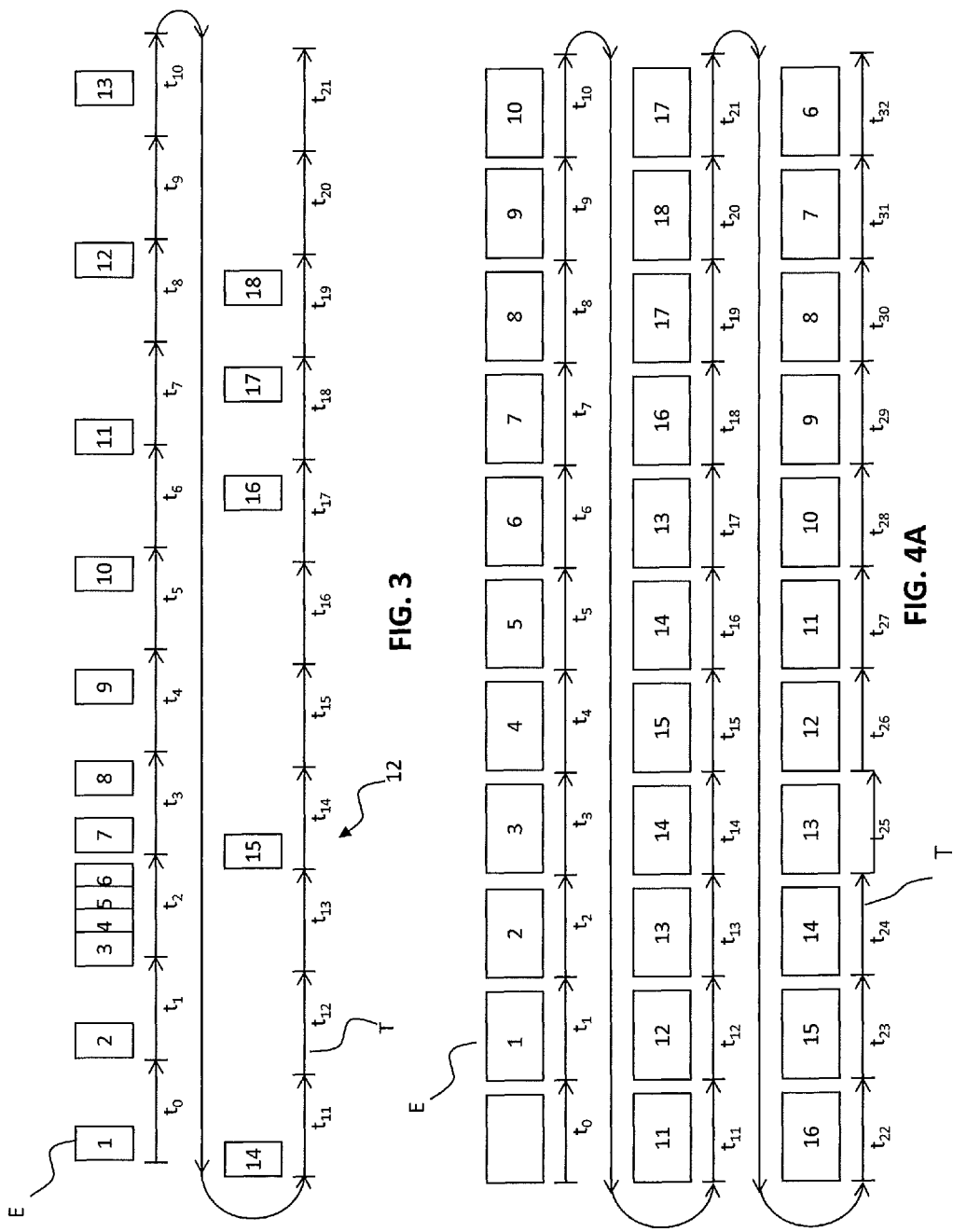

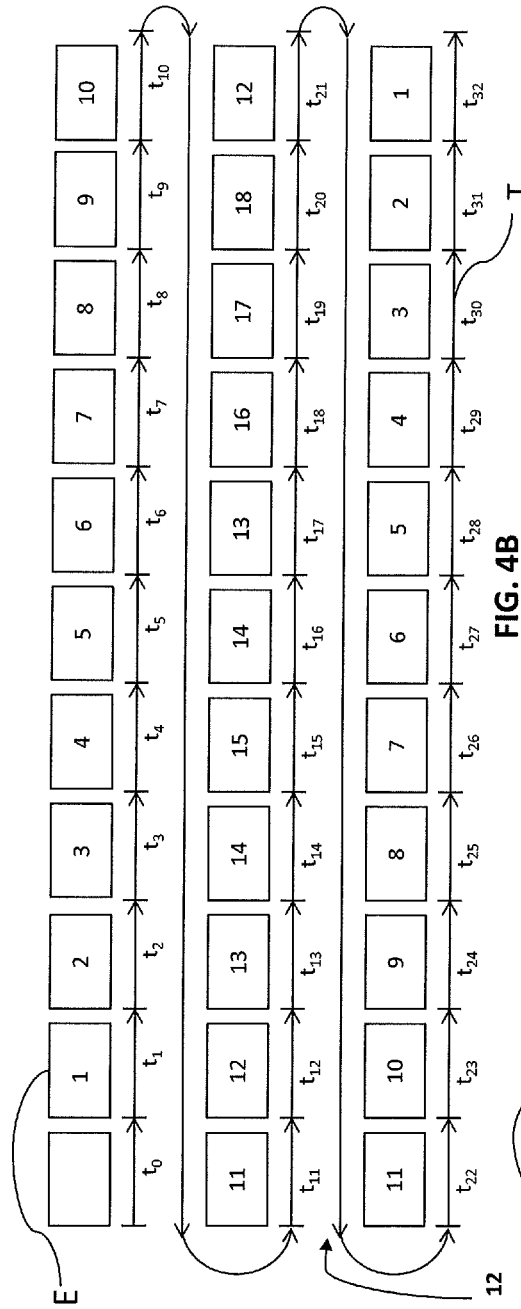
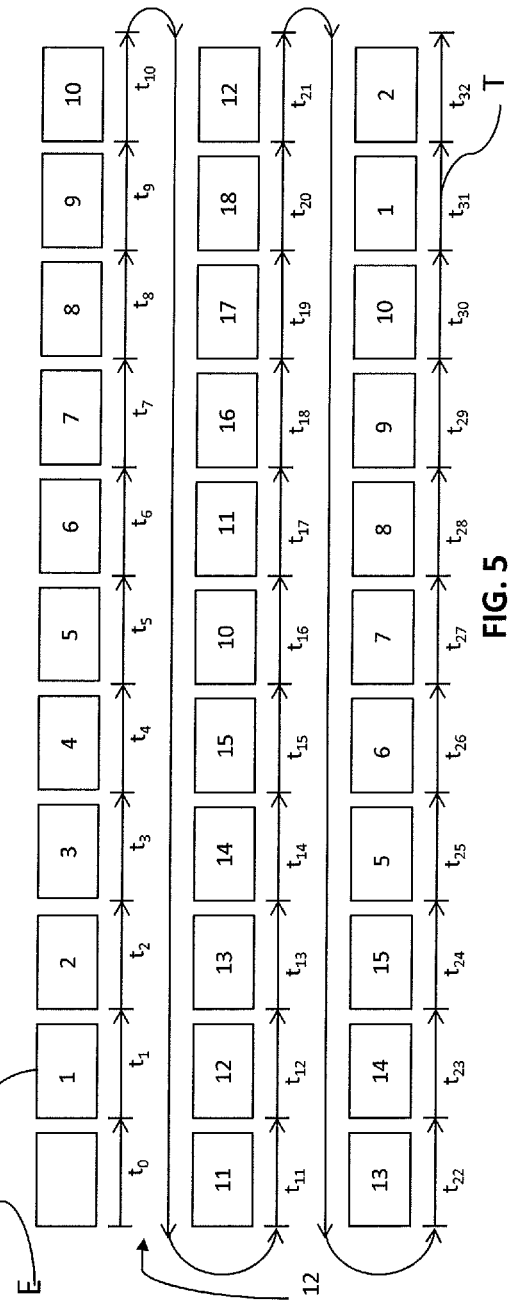

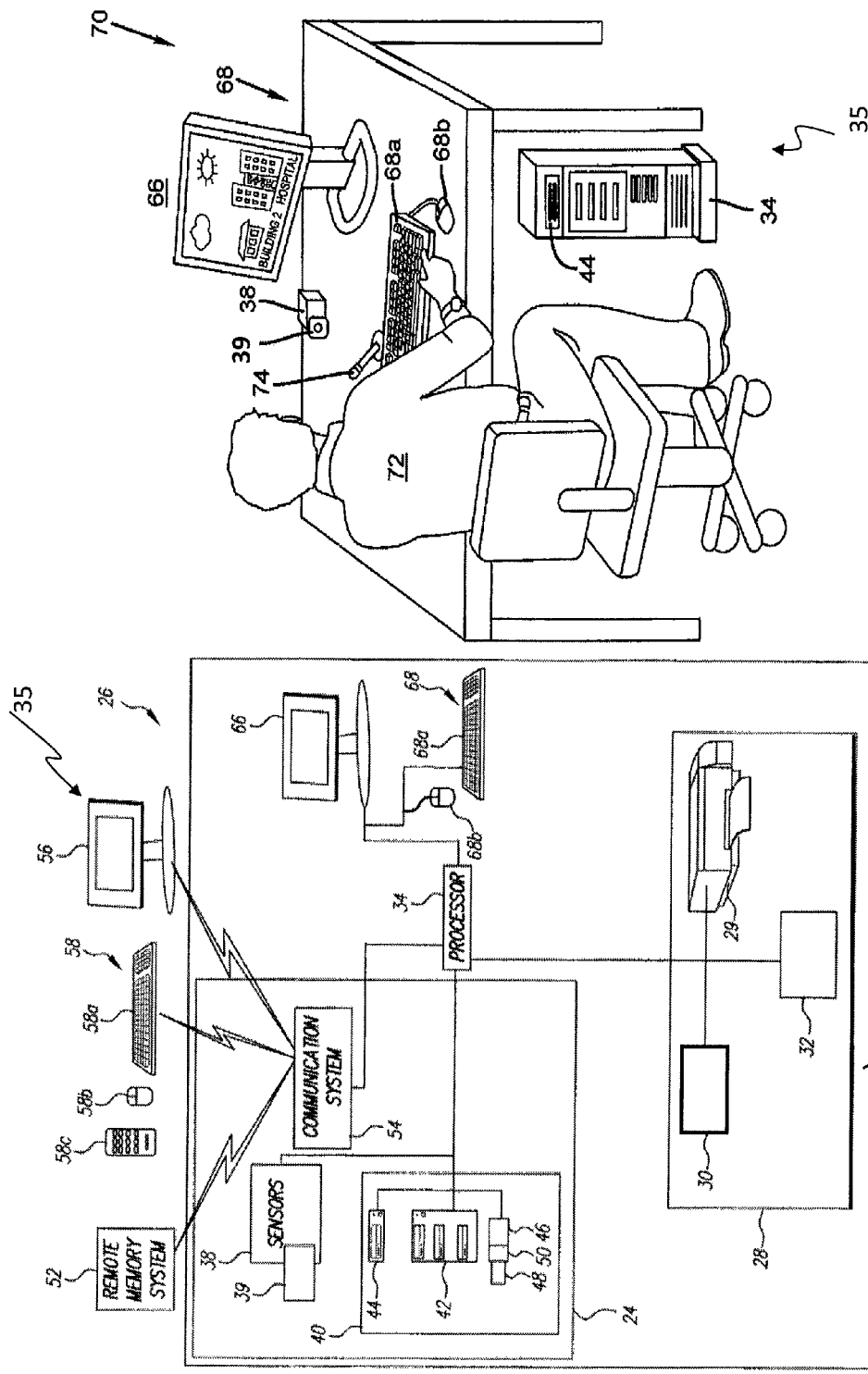

```
//Display oldestnew event for 2 seconds.
while (true){
    getNewEvent();
    if (oldestnew is not the most recent event in the list) {
        ++oldestnew;
        display oldestnew for 2 seconds;
    }
    else  {// new ImageEvent creation slowed down, play a flashback
        if (newestold is the oldest event in the list) {
            getOldEvents;
        }
        if (newestold is the oldest event in the list) {
            newestold=oldestnew;
        }
        --newestold;
        display newestold ImageEvent for 2 seconds;
    }
//flashback end, restart
}
```

FIG. 13

```
//   E is array of image events, oldest first
//   Buffer 12 new image events; allow 60 seconds max behind real time
//   Image event display for 3-10 seconds
//   Numbers used in place of symbols to improve understanding
int r=6;                    //seconds to display an image event
int c=0;                    //index of currently-displayed image event
while (true)   {
    list E = getEvents();
    int b = E.length()-c;            //actual buffer length;
    if (b > 0) {
        if (b > 60/3  && r==3){     // fallen behind, cannot speed   // up more, so skip ahead
            c=n-12;
        }
        if (b> 12  && r>3)                    {   // speed up
            --r;
        }
        else if (b < 12 && r < 10) { //slow down
            ++r;
        }
        display(E[c,r]);
        ++c;
    }
    else    { // show older events
    }
}
```

FIG. 14

PRESENTING IMAGES FROM SLOW IMAGE-EVENT STREAM

CROSS-REFERENCE TO RELATED APPLICATIONS

Reference is made to U.S. patent application Ser. No. 13/351,596, entitled "Presenting Images from Fast Image-Event Stream" by Ron Barzel, et al., the disclosure of which is incorporated herein.

FIELD OF THE INVENTION

The present invention relates to a method for displaying images and image-related information from a real-time sequence of images captured by users at an imaging event.

BACKGROUND OF THE INVENTION

Digital cameras used to electronically record images are in widespread use. Some digital cameras incorporate communication circuits for wirelessly transmitting captured digital images to computers or other electronic storage devices. Likewise, mobile communication devices, such as cellular telephones and smart phones, that each includes a processor, display, and digital camera are very popular around the world and are used to acquire, display, and transmit digital images and video sequences as well as, in some cases, support internet access.

Captured images and image sequences can be stored on the capturing device or can be communicated to, and stored in, remote electronic storage devices, for example on home computers. Captured images and image sequences can also be stored on computer servers available through a communications network such as the internet. On-line digital image service providers enable digital image storage, communication, and image products using the stored digital images. The Kodak Gallery is one example of a number of such services. Computers, electronic storage, communication networks such as the internet, servers, and software for displaying digital images, either remotely or locally on a computer are all well known in the art.

It is also known to enable on-line digital image sharing with such digital image service providers. In this case, digital image owners enable access to their images by specified individuals, who can then remotely view the stored digital images. Social networks also provide digital image sharing for persons granted access to a user's digital image collection. In such networks, users can comment upon, register approval or disapproval of an image, or otherwise socially interact with each other about the shared digital images. US2009/0307602 teaches systems and methods for creating and sharing a presentation. US2007/0043792 discloses an image processing system for capturing images from an event and for distributing images so obtained to one or more clients.

Digital images can be ordered and presented in slideshows. One simple ordering arrangement is by date/time of capture. Other orders are by digital image file name, as specified by a user, or by analyzing the images and grouping them into events and structuring an ordered digital image sequence that can be viewed as a slide show.

A variety of methods are known in the prior art for automating the selection of images from an image collection, for example as described in U.S. Patent Application 2011/0123124. It is known to select images based on an image quality criterion, to select images shared in a social network that are the most commented upon or that have a relatively large number of approvals, and to recognize individuals depicted in a photograph. Semantic understanding of an image can be used to automatically create an image product, as described in WO 2008/156558 and U.S. Pat. No. 7,035,467.

U.S. Patent Application Publication 2009/0051826 describes a method for displaying pictures in a digital picture slide show. The method includes receiving a plurality of pictures, determining display characteristics of the plurality of pictures according to weighting values of the plurality of pictures, and displaying the plurality of pictures according to the display characteristics of the plurality of pictures. The display characteristics include display duration, order and effects, and can be based on image information including browsing status, viewing statistics, rating results, and comment counts. US2004/0125128 discloses a graphic user interface for a slideshow presentation.

US20110069179 teaches coordinating different image capture devices at an event so that images captured by the different devices may form a cohesive and consistent image set. The system includes a group of image capture devices, referred to as an event capture group, wirelessly communicating with a remote server. The image capture devices in an event capture group can include still image cameras, video recorders, mobile phones and other devices capable of capturing images. The server coordinates the devices in a group before images are taken, so that the resultant images from the different devices are consistent with each other and may be aggregated into a single, cohesive image set. Images from different devices in the group may be uploaded during an event and organized on a remote database into the image set which may be viewed during or after the event These prior-art methods for capturing, displaying, and sharing digital images are relatively static. Digital image collections are obtained, analyzed or reviewed or otherwise organized or processed, and are presented or used for an image product. In a more dynamic context, however, image collections and reviews can change as users interact socially. There is, therefore, a need for a dynamic method for presenting digital images that enables a social group to interactively capture, review, and present digital images or other digital media.

SUMMARY OF THE INVENTION

In accordance with the present invention there is provided a method of dynamically presenting temporally ordered image events, comprising:

providing a pre-determined presentation rate and a corresponding pre-determined presentation period;

using a processor to receive at irregular intervals a plurality of temporally ordered image events at an average image event rate less than the presentation rate;

storing the received image events in an ordered list corresponding to the order in which the image events were received;

accessing, according to a pre-determined rule, stored image events from the ordered list;

sequentially presenting the accessed image events for the presentation period; and interrupting the sequential presentation of the stored image events when a new image event is received and presenting the received new image event for the presentation period and resuming the sequential presentation of the accessed image events.

It is an advantage of the present invention that an effective method is provided to present images to users that is engaging and interesting and aids social interactions.

A feature of the invention is that a plurality of users can capture and store images in real-time under a variety of circumstances while viewing and reviewing the captured and stored images.

BRIEF DESCRIPTION OF THE DRAWINGS

FIG. 3 is a timeline illustrating image events useful in understanding the present invention;

FIG. 4A is a timeline illustrating the presentation of image events in an embodiment of the present invention;

FIG. 4B is a timeline illustrating the presentation of image events in an embodiment of the present invention;

FIG. 5 is a timeline illustrating the presentation of image events in an embodiment of the present invention;

FIG. 9 is a schematic illustrating another system useful for performing a method of the present invention;

FIG. 10 is a schematic illustrating another system useful for performing a method of the present invention;

FIG. 13 is a software code fragment useful in understanding the present invention; and FIG. 14 is a software code fragment useful in understanding the present invention.

DETAILED DESCRIPTION OF THE INVENTION

Figure 1:
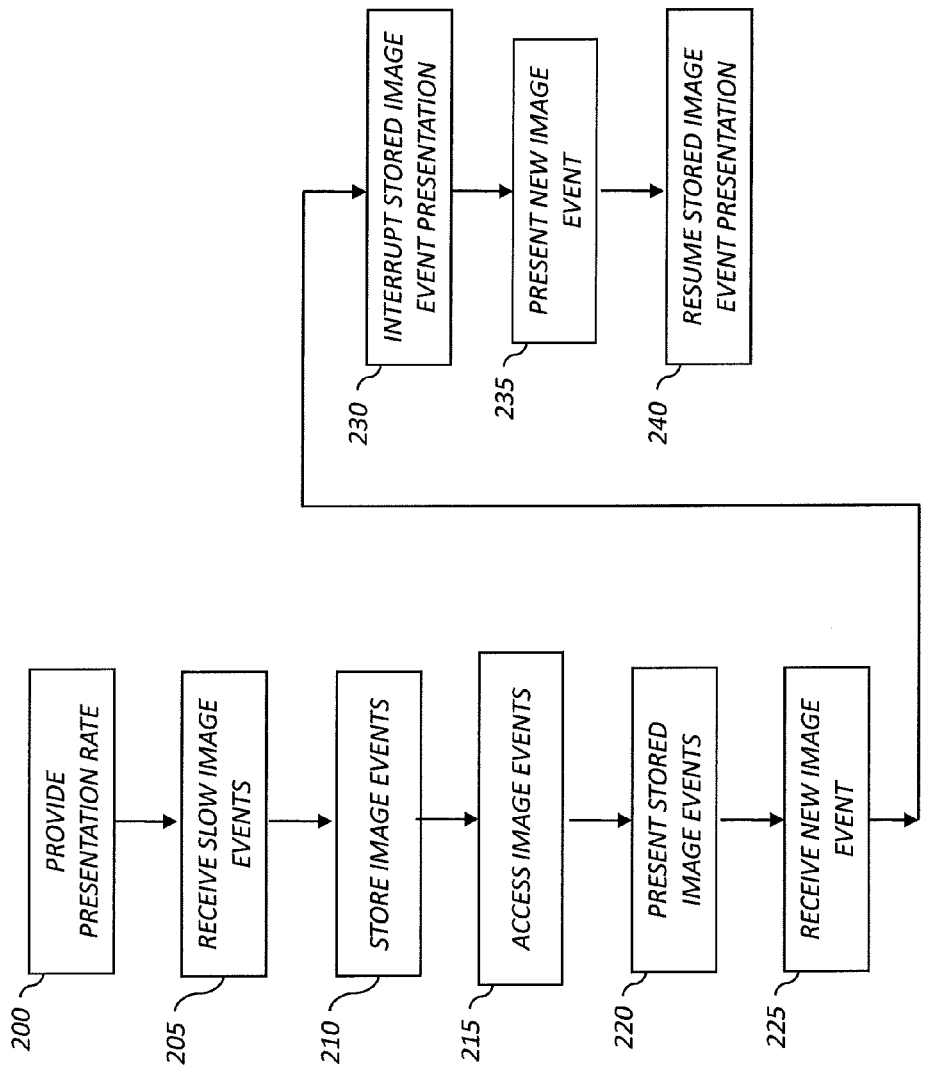
FIG. 1 is a flow diagram according to an embodiment of the present invention.

The present invention describes a method for dynamically presenting temporally ordered image events. Referring to FIG. 1, the method includes providing a pre-determined presentation rate and a corresponding pre-determined presentation period in step 200, using a processor to receive at irregular intervals a plurality of temporally ordered image events at an average image event rate less than the presentation rate in step 205, storing the received image events in an ordered list corresponding to the order in which the image events were received in step 210, accessing, according to a pre-determined rule, stored image events from the ordered list in step 215, and sequentially presenting the accessed image events for the presentation period in step 220. When a new image event is received (step 225), the sequential presentation of the stored image events is interrupted in step 230 and the received new image event is presented for the presentation period in step 235. After the received new image event is presented for the presentation period, the sequential presentation of the accessed image events is resumed in step 240.

Figure 2:
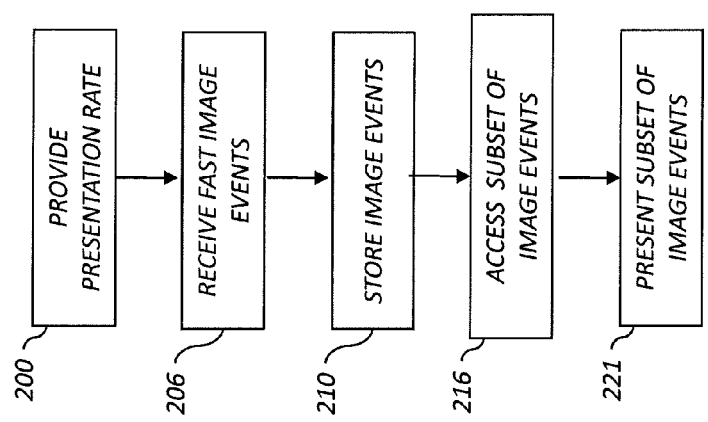
FIG. 2 is a flow diagram according to another embodiment of the present invention.

In another embodiment of the present invention illustrated in FIG. 2, a method of dynamically presenting temporally ordered image events includes providing a pre-determined presentation rate and a corresponding pre-determined presentation period in step 200, using a processor to receive at irregular intervals a plurality of temporally ordered image events at an average image event rate greater than the presentation rate in step 206, storing the received image events in an ordered list corresponding to the order in which the image events were received in step 210, accessing, according to a pre-determined rule based on the pre-determined presentation rate and image event rate, a subset of the stored image events from the ordered list in step 216 and sequentially presenting each of the accessed subset of image events in the order in which the image events were received for the presentation period in step 221.

Image events are events or occurrences that are image-related, for example, captured photographs, comments, or registering approval of an image. The image events are captured and stored in a presentation system. The image events include the posting of a new image to a computer or presentation server, the receipt of an image comment, or the receipt of an image approval (e.g. a "Like" selection for the image). The image events can include multi-media elements, for example, images (still or video), audio, and text. Image events can be received from a plurality of participants in a group social event (e.g. a party, sporting event, theater event, music event, or outdoor event). The image events occur and are captured at discrete moments in time and can be uploaded to a presentation computer server. The presentation server can receive the image events in a temporal order, e.g. in order as they are received through time. The received image events are then presented to the participants in the group social event, for example received images are displayed, and comments or approvals are displayed with their corresponding images. For example, a user can be present at a group social event, capture an image of an occurrence (e.g. a picture of a friend doing an amusing activity) with a network-connected digital camera, cell phone, or smart-phone, upload the image, and view the image, together with images captured by others at the event, on a display device, e.g. a television in a room in which the group is meeting, or on a user's mobile display device. The image and any image information can be displayed on the same device with which images are captured and uploaded.

Figure 11:
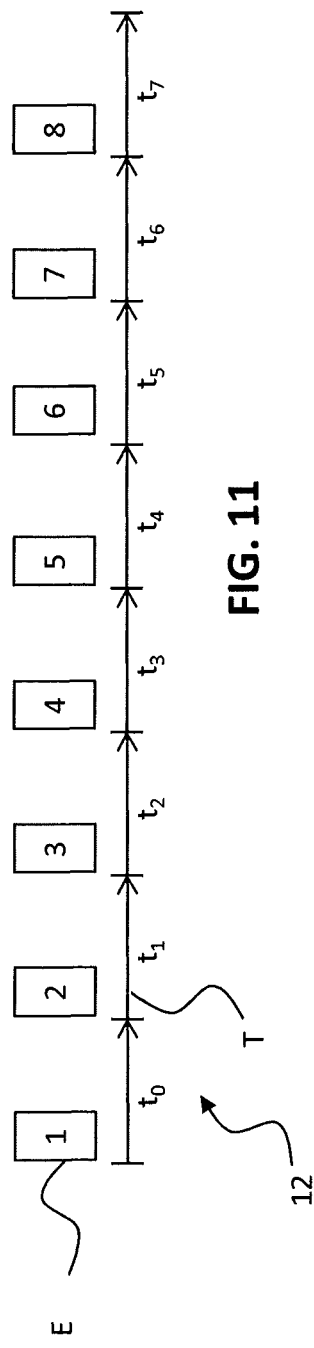
FIG. 11 is a timeline illustrating image events useful for understanding the present invention.
Figure 12:
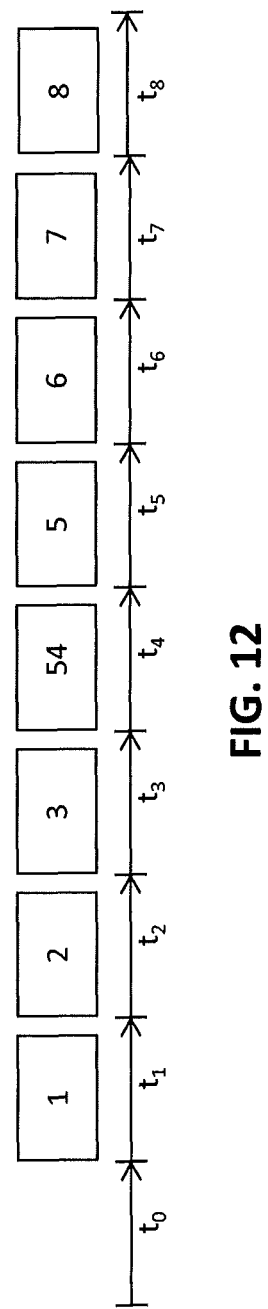
FIG. 12 is a timeline illustrating the presentation of image events useful for understanding the present invention.

The present invention provides a method for presenting image events to participants in a group event as the events occur. Referring to FIG. 11, image events E are shown on a timeline 12. As illustrated in FIG. 11, the image events E occur at a regular and predictable rate of one for every time interval T. FIG. 12 illustrates the presentation of the image events E over the time intervals on the timeline 12. Since the image event E occurrence rate (average image event rate) matches the presentation rate (one presentation per time period) in this example, image events E can be presented in real time without any adjustment. However, according to embodiments of the present invention, image events E occur at irregular intervals and at an average image event rate that is different from the presentation rate and not at the regular and predictable rate of FIGS. 11 and 12.

The first embodiment of FIG. 1 above addresses the case in which image events E occur relatively slowly so that previously recorded image events E are presented between newly received image events E. The second embodiment of FIG. 2 above addresses the case in which image events E occur relatively quickly so that more image events E are received than are easily presented so that only some of the image events E are initially presented. The first time an image event E is received and presented, the image event E is termed a first-time image event. If the same image event is subsequently presented again, the image event is termed a previously-presented image event.

Various embodiments of the present invention can be employed by a group of users that capture images of an event, upload the captured images to a presentation server, and then view the images on a display device, such as a mobile telephone, smart phone, or other display such as a television or monitor. Image capture can be done by a digital camera, either stand-alone or part of a cellular telephone (e.g. smart-phone or cell phone with or without a display). The presentation server can be a network-connected computer server that can receive wireless communications (for example through a cellular telephone network or WiFi computer network). The computer server includes communications circuits for receiving and transmitting digital images and image-related information, electronic storage for storing received images and information, a processor for executing stored programs for ordering, controlling, and presenting images and information, and optionally, display circuitry for displaying images directly or through a network-mediated interface (e.g. through the internet, through browsers, through WiFi or Bluetooth wireless modalities, through communication with remote computing devices, or in concert with remote browsers executing on remote computers.

As used herein, dynamically presenting refers to presenting image events to a user where the presentation changes depending on the time the user requests a presentation, the time at which image events E occur, or the type of image event. According to embodiments of the present invention, if a user observes a presentation of a set of image events E at a first time, the presentation is very likely to be presented differently at a second, different time.

The presentation rate is a pre-determined value that represents the number of image events E that are presented to a viewer over a period of time. The length of time used to present each image event E is the presentation period and is the inverse of the presentation rate. For example, if the presentation rate is one image event E every 10 seconds, the presentation period is 10 seconds. Because the rate at which humans can absorb information is limited, it is desirable to present information for a long enough time that a viewer can perceive, understand, or enjoy an image or image-related information. Image-related information can be text or audio, for example, and the presentation period can be long enough to enable a viewer to read the text. The presentation period can depend upon the type of image event E (e.g. still image, video image sequence, text, or audio) and can vary depending on the rate at which image events E are received. Thus, a presentation period and corresponding presentation rate can have a minimum and a maximum value.

Image events E are received at irregular intervals so that the receipt of an image event E cannot be easily predicted. The average rate at which image events E are received over a period of time is the average image event rate. The period of time over which image events E are averaged to determine the average image event rate can vary over time to help control buffering of image events E and to manage the presentation rate or period and to select previously-presented image events E or to skip recently received image events. E Received image events E are stored, for example in an electronic storage device such as a solid-state memory, a rotating hard-disk with magnetic media, an electronic random-access memory (RAM) or the like as is known in the computing and electronic arts. Although a variety of methods can be employed to store the received image events E as is known to those skilled in the arts, one useful method is to employ an ordered list such as a linked list. Another useful method is to use a database having a variable size and to order the received image events in the database, for example, by storing subsequent image events E in subsequent database entries. Stored image events E can be accessed by reading the memory in which the image events E are stored or by employing database access commands. Such storage and retrieval methods are well known in the computing arts.

Image events E are presented by displaying the images, related text, audio, or video on display devices, for example monitors, televisions, mobile phone or smart-phone displays, and the like. Such display devices are readily available. The display can be under the immediate control of the presentation server (for example with display circuits connected to the presentation server or computer server that stores the image events E. Alternatively, the display can be remote from the presentation server and connected to the presentation server through a communications network, such as the internet, computer networks, wired telephone network, cellular telephone networks, or wireless computer networks such as WiFi or Bluetooth. In this alternative case, the presentation server communicates the image event information to a remote processor that executes a program for presenting the image event information. The remote processor can be a personal computer, mobile telephone with a display, or a television with network access. All of these devices are commercially available. One useful method is to employ an internet web server executing on the presentation or computer server and a web browser on the remote processor. Images are presented for the presentation period.

The presentation period range can be chosen to be short enough so that viewers do not get bored and long enough that viewers can understand and appreciate the information (e.g. image, text, audio) that is part of the image event. For example, a presentation period can range from two seconds to ten seconds. If the image event rate increases, the presentation period can decrease to accommodate the increased number of image events E over time, down to the minimum presentation period. If the image event rate decreases, the presentation period can increase to accommodate the decreased number of image events E over time, up to the maximum presentation period. Alternatively, the presentation period can be a single value, although it can vary, for example depending on the image event rate.

Referring to the example of FIG. 3, the occurrence of image events E are illustrated on a timeline 12. Each image event E is labeled with a value representing the order in which the image event E occurred; image event 1 occurs first, image event 2 occurs second, and so forth. The time periods T are similarly labeled. As can be seen from FIG. 3, the image events E occur irregularly, some image events E occurring very rapidly (for example during time interval $t_2$) and other image events E occurring very slowly (for example during time periods $t_{10}$ to $t_{17}$). Because of this irregular occurrence, the image events E cannot be presented as they occur, in contrast to the comparative example of FIGS. 11 and 12.

If image events E arrive at a rate less than the presentation rate, the image events E can be presented for the maximum presentation period. At the end of the presentation period, previously-presented image events E can be presented, for example by sequentially presenting image events E in the reverse order in which they were received beginning at some arbitrary moment, for example with the image event just prior to the most recently received image event.

Referring to FIG. 4A, the image events E of the FIG. 3 example are presented to illustrate various embodiments of the present invention. As shown in FIG. 4A, the image events E are buffered and presented at a rate of one per presentation period (corresponding to the time interval T). Because the image events E occur at a faster average rate than the presentation rate, the presentation of the image events E falls behind real time, for example image event 7 is presented in time interval 7 but occurs in time interval 3. Therefore, the image events E are stored in a buffer (for example an ordered, linked list or database with order information in an electronic storage system or memory). As the occurrence of image events E slows down, the presentation of the image events E catches up by time interval 15. At this point, because the average rate of new image events E is slower than the presentation rate, there are no new image events E to present. Therefore, according to an embodiment of the present invention, stored image events E in the ordered list are accessed and sequentially presented in reverse order, beginning with the most recent image event 14 and then image event 13. At this point, a new image event is received, the sequential presentation of the stored image events E is interrupted, and the newly received image event 16 is presented for the presentation period. During this time, new image events 17 and 18 are received and likewise presented, each for the presentation period. After the presentation of image events 16-18, no new image events E are received and the sequential presentation of the accessed image events E in reverse order is resumed, beginning anew with the most recent previously presented image event. Referring to FIG. 4B, when the sequential presentation of the accessed image events E in reverse order is resumed, the resumption continues with the image event at the point of interruption. Thus image event 12 is presented next, followed by image event 11, and so on.

Alternatively, image events E from some time interval in the past can be sequentially presented in the order in which they were received. Sequentially showing a series of previously presented image events E is termed herein a flashback. Flashbacks can be arbitrarily set to a desired time interval, for example ten seconds, and can begin at an arbitrary point in the past, for example for the time interval just prior to the most recently received image event. The flash-back time interval can be the length of time since the first image event was received (i.e. the entire ordered list), less than the time since the first image event was received, or the time between the last two image events E received, or the average time between image events E. The averages can be taken over desired periods of time that result in an engaging and interesting presentation. Flashback presentations can continue until the image event prior to the most recent first-time image event is presented or for some predetermined time interval. If a new image event is received during a flashback presentation, the flashback presentation is interrupted to present the newly received image event for the presentation period. At the conclusion of the presentation of the newly received image event, a new flashback can commence or the interrupted flashback can be recommenced. If a flashback is completed without receiving a new image event, another flashback can begin, for example for the time period just prior to the completed flashback or some multiple of the flashback time interval. For example, a first flashback can replay the image events E for the prior ten second, a second flashback can replay the image events E for the ten seconds beginning 20 seconds earlier, and a third flashback can replay the image events E for the ten seconds beginning 30 seconds earlier.

Referring to FIG. 5, a flashback period of 5 time intervals is illustrated. After the buffered image events E are presented, the next image event five prior to the most recent image event 15 is presented, that is, image event 10. The subsequent image event 11 is then presented but is interrupted by new image events 16-18. At this point, according to various embodiments of the present invention, either a new flashback could commence, for example beginning with image event 13 (five earlier than the most recent image event) or the prior flashback could be resumed. In the example of FIG. 5, the prior flashback is resumed with image event 12 and continues until it is completed with image event 15. Again, a new flashback, for example beginning with image event 17 could commence, but in this example, the image event for the flashback interval prior to the most recent flashback begins with image event 5 (five less than 10, the first image event of the prior flashback). This second flashback continues to completion, after which another flashback begins, at the beginning of the image event sequence.

If image events E arrive at a rate greater than the presentation rate, a subset of the image events E can be presented for the minimum presentation period. The subset can be chosen in different ways. In one example, a periodic selection of image events E is chosen, for example every other or every third image event is presented until the presenting system catches up and can present newly received image events E as they are received. In another example, sequential groups of image events E are chosen followed by a temporal gap during which sequential image events E are not selected for presentation. For example, five image events E can be presented, the next five events are stored but not presented during the temporal gap, and then the process repeats until the presenting system catches up and can present newly received image events E as they are received. After the presentation of newly received image events E is caught up and the receipt of new image events E slows down, flashback presentations can be used to present the image events E that were not presented when the image events E were received. Thus, over time, image event flashbacks are presented and interrupted with subsets of newly received E as the image event rate varies.

Figure 6:
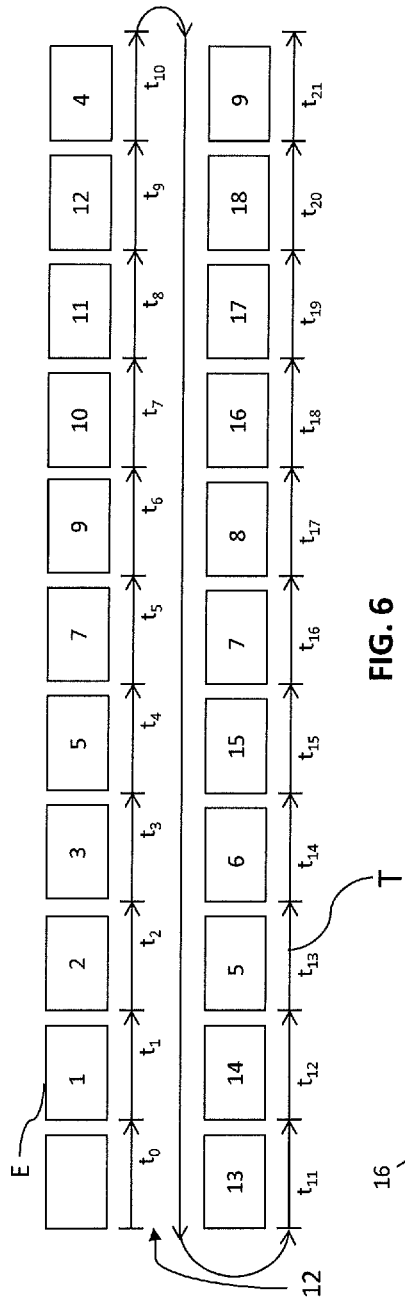
FIG. 6 is a timeline illustrating the presentation of image events in an embodiment of the present invention.

Referring to FIG. 6, image events E from the example of FIG. 3 are presented. In this example, the image events E that occur too rapidly to be presented in real time are not buffered for as long a period. The length of time a presentation system buffers image events E without presenting them is a matter of choice and dictates how old image events E are before they are presented. In one case, the length of time could be relatively large so that image events E are buffered without presentation for a relatively long time, as in the example of FIGS. 4A and 4B. In the example of FIG. 6, the length of time is chosen to be shorter so that the image events E presented are closer to real time and thus can be more engaging to users but at the expense of not presenting some excluded image events E until later. In the example of FIG. 6, every other image event is excluded and not presented until the presented image events E have caught up with those received. In this example, image events 3, 5, 7, and 9 are presented and image events 2, 4, 6, 8 are excluded. After image event 9 is presented, newly received image events 10, 11, and 12 are presented as they are received. Since no new image events E are received for time interval 10, a previously presented or stored image event can be presented. Any of the methods described above could be used in this example, but an alternative method of selecting image events E based on whether they have been previously presented or not is chosen for this example. Since E was skipped beginning with image event 4, a flashback beginning with image event 4 is commenced. This flashback is interrupted with the receipt of image events 13 and 14, but then resumes with image event 5 in time interval 13. Image event 15 again interrupts the flashback, as do image events 16-18, but the flashback resumes after each interruption.

According to other embodiments of the present invention, users can override the image event presentation provided by the presentation server to view specific E or to temporarily stop ('pause') the playback of image events E to, for example, view a particular image event in more detail over a longer period of time, or for other personal reasons. Thus, in an embodiment, previously presented image events E are presented to each user at a different time.

The presentation server can receive image events E from a plurality of different users and can support multiple different image event stream presentations for the different users. However, newly received image events E will tend to be presented at approximately the same time to all of the different users, since other flashback presentations are interrupted with the latest image event. Thus, according to various embodiments of the present invention, a group of users captures, stores, and reviews images and image-related information such as comments in real-time under a variety of circumstances. Users at a social gathering are thus provided with an effective method for presenting image events E that is engaging and interesting and aids social interactions.

Image events E can be similar as different users capture the same image event. In another embodiment of the present invention, image events E are consolidated into a single event. For example, two users can comment on the same image, making two separate image events E. It can be more understandable and efficient to present the two comments together in a single image event. Thus, the presentation server can combine or consolidate separate image events E into a single image event. Alternatively, if two similar images are captured by two different users and uploaded to the presentation server, it can be useful to remove one of the image events E (and the associated image) from the ordered list. The choice of which images to keep and which to remove can be made on the basis of image quality, interest, distinctiveness, or contributor. For example, image events E captured by a user that does not participate as frequently can be preferred.

Figure 7:
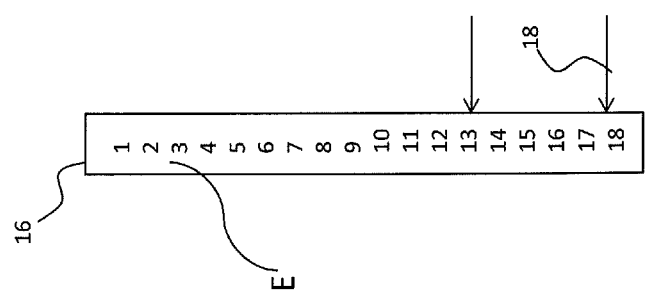
FIG. 7 is an illustration of an ordered list stored in a memory with indexing pointers useful in understanding the present invention.

As image events E are received by the presentation server or other computer or computer server, they can be stored in an ordered list. The ordered list can act as a buffer, queuing received image events E as they are received before they are presented. Event buffering for subsequent disposition or action is a well-known process in computer system, as are interrupts that temporarily exchange one executing process in a computer system for another. FIG. 7 illustrates a list of image events E stored in temporal order in a memory 16. Two pointers 18 (illustrated with arrows) illustrate values used to index into the image event list. In conventional practice, memory locations have addresses used to access the values stored in the memory. Pointers (for example stored in registers or other memory locations) having memory location addresses in the ordered list are used to access the values stored in the memory. By incrementing or decrementing the pointer values, values in the ordered list can be accessed in order. The use of pointers to access list elements is well known in the computer science arts.

FIG. 13 illustrates a "pseudo-code" implementation of a program that presents flashbacks to a user. By pseudo-code is meant an incomplete programmatic illustration that cannot be executed or compiled but that illustrates the form of a program that can execute a given function. The illustration of FIG. 13 can fall arbitrarily behind real-time and thus illustrates a useful approach to the case in which the average image event rate is less than the presentation rate. As shown in FIG. 13, two pointers, oldestnew and newestold, are maintained and initialized to the head of the event list. getNewEvent( ) and getOldEvents( ) returns new and old events in the list. In the first "if" case, new events are displayed as they are received. If not, the "else" case presents a flashback.

FIG. 14 illustrates a "pseudo-code" implementation of a program that skips image events E and presents other image events E at modified presentation rates to a user. The illustration of FIG. 14 uses a pointer c that indexes into the event list E and is modified when the presentation has fallen behind real time receipt of new image events E and a value r that changes the presentation period within a range of 3 to 10 seconds.

Various embodiments of the present invention can be implemented using a variety of computers and computer systems illustrated in FIGS. 8, 9 and 10 and discussed further below. In one preferred embodiment, for example, a desktop or laptop computer executing a software application can provide a multi-media display apparatus suitable for receiving, storing, accessing, and presenting images and image-related information. In a preferred embodiment, a multi-media display apparatus comprises: a display having a graphic user interface (GUI) including a user-interactive GUI pointing device; a plurality of multi-media elements displayed on the GUI, and user interface devices for providing means to a user to enter or transmit information into the system. A desktop computer, for example, can provide such an apparatus.

In another preferred embodiment, a computer server can provide web pages that are served over a network to a remote client computer. The web pages can allow a user of the remote client computer to upload digital images or image-related information. Applications provided by the web server to a remote client can organize uploaded digital images, either as stand-alone software tools or provided through html, Java, or other known-internet interactive tools. In this embodiment, a multi-media display system comprises: a server computer providing graphical user interface display elements and functions to a remote client computer connected to the server computer through a computer network such as the internet, the remote client computer including a display having a graphic user interface (GUI) including a user-interactive GUI pointing device; and a plurality of multi-media elements stored on the server computer, communicated to the remote client computer, and displayed on the GUI.

Computers and computer systems are stored program machines that execute software programs to implement desired functions. According to a preferred embodiment of the present invention, a software program executing on a computer with a display and graphic user interface (GUI) including a user-interactive GUI pointing device includes software for presenting a plurality of multi-media elements having images on the GUI and for performing the steps of the various methods described above.

Figure 8:
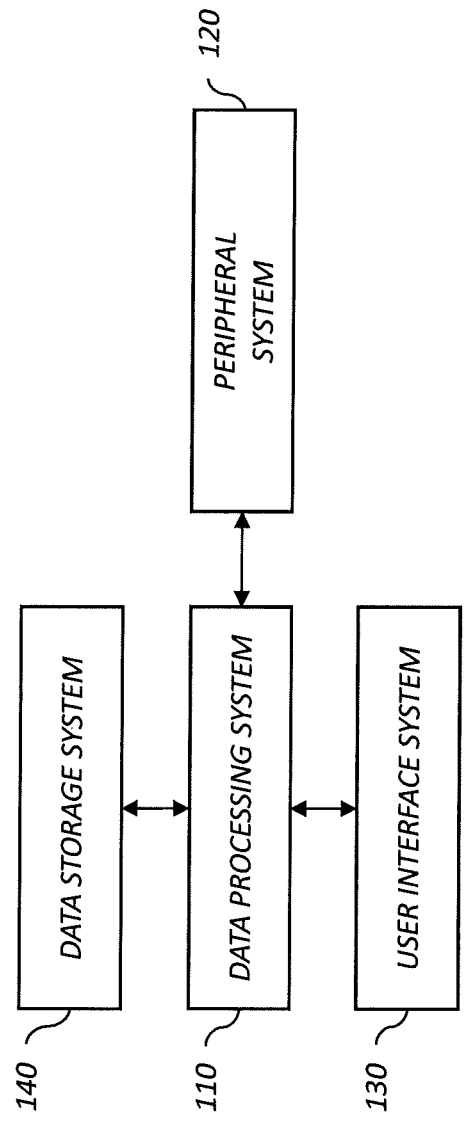
FIG. 8 is a schematic illustrating a system useful for performing a method of the present invention.

FIG. 8 is a high-level diagram showing the components of a system useful for various preferred embodiments of the present invention. The system includes a data processing system 110, a peripheral system 120, a user interface system 130, and a data storage system 140. The peripheral system 120, the user interface system 130 and the data storage system 140 are communicatively connected to the data processing system 110. The system can be interconnected to other data processing or storage system through a network, for example the internet.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, a digital picture frame, cellular phone, a smart phone or any other device for processing data, managing data, communicating data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 can be a distributed processor-accessible memory system including multiple processor-accessible memories communicatively connected to the data processing system 110 via a plurality of computers or devices. On the other hand, the data storage system 140 need not be a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, caches, floppy disks, hard disks, Compact Discs, DVDs, flash memories, ROMs, and RAMs.

The phrase "communicatively connected" is intended to include any type of connection, whether wired or wireless, between devices, data processors, or programs in which data is communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 can be stored completely or partially within the data processing system 110. Further in this regard, although the peripheral system 120 and the user interface system 130 are shown separately from the data processing system 110, one skilled in the art will appreciate that one or both of such systems can be stored completely or partially within the data processing system 110.

The peripheral system 120 can include one or more devices configured to provide digital content records to the data processing system 110. For example, the peripheral system 120 can include digital still cameras, digital video cameras, cellular phones, smart phones, or other data processors. The data processing system 110, upon receipt of digital content records from a device in the peripheral system 120, can store such digital content records in the data storage system 140.

The user interface system 130 can include a mouse, a keyboard, another computer, or any device or combination of devices from which data is input to the data processing system 110. In this regard, although the peripheral system 120 is shown separately from the user interface system 130, the peripheral system 120 can be included as part of the user interface system 130.

The user interface system 130 also can include a display device, a processor-accessible memory, or any device or combination of devices to which data is output by the data processing system 110. In this regard, if the user interface system 130 includes a processor-accessible memory, such memory can be part of the data storage system 140 even though the user interface system 130 and the data storage system 140 are shown separately in FIG. 8.

Referring to FIGS. 9 and 10, computers, computer servers, and a communication system are illustrated together with various elements and components that are useful in accordance with various preferred embodiments of the present invention. FIG. 9 illustrates an embodiment of an electronic system 20 that can be used with the present invention. In the preferred embodiment of FIG. 9, electronic system 20 comprises a housing 22 and a source of content data files 24, a user input system 26 and an output system 28 connected to a processor 34. The source of content data files 24, user-input system 26 or output system 28 and processor 34 can be located within housing 22 as illustrated. In other preferred embodiments, circuits and systems of the source of content data files 24, user input system 26 or output system 28 can be located in whole or in part outside of housing 22.

The source of content data files 24 can include any form of electronic or other circuit or system that can supply digital data to processor 34 from which processor 34 can derive images for use in forming an image-enhanced item. In this regard, the content data files can comprise, for example and without limitation, still images, image sequences, video graphics, and computer-generated images. Source of content data files 24 can optionally capture images to create content data for use in content data files by use of capture devices located at, or connected to, electronic system 20 or can obtain content data files that have been prepared by or using other devices. In the preferred embodiment of FIG. 9, source of content data files 24 includes sensors 38, a memory 40 and a communication system 54.

Sensors 38 are optional and can include light sensors, biometric sensors and other sensors known in the art that can be used to detect conditions in the environment of system 20 and to convert this information into a form that can be used by processor 34 of system 20. Sensors 38 can also include one or more video sensors 39 that are adapted to capture images. Sensors 38 can also include biometric or other sensors for measuring involuntary physical and mental reactions such sensors including, but not limited to, voice inflection, body movement, eye movement, pupil dilation, body temperature, and p4000 wave sensors.

Memory 40 can include conventional memory devices including solid-state, magnetic, optical or other data-storage devices. Memory 40 can be fixed within system 20 or it can be removable. In the preferred embodiment of FIG. 9, system 20 is shown having a hard drive 42, a disk drive 44 for a removable disk such as an optical, magnetic or other disk memory (not shown) and a memory card slot 46 that holds a removable memory 48 such as a removable memory card and has a removable memory interface 50 for communicating with removable memory 48. Data including, but not limited to, control programs, digital images and metadata can also be stored in a remote memory system 52 such as a personal computer, computer network or other digital system. Remote memory system 52 can also include solid-state, magnetic, optical or other data-storage devices.

In the preferred embodiment shown in FIG. 9, system 20 has a communication system 54 that, in this preferred embodiment, can be used to communicate with an optional remote memory system 52, an optional remote display 56, or optional remote input 58. The optional remote memory system 52, optional remote display 56, optional remote input 58 can all be part of a remote system 35 having an input station with remote input controls (also referred to herein as "remote input 58"), and can include a remote display 56, that can communicate with communication system 54 wirelessly as illustrated or can communicate in a wired fashion. In an alternative embodiment, a local input station including either or both of a local display 66 and local input controls 68 (also referred to herein as "local user input 68") can be connected to communication system 54 using a wired or wireless connection.

Communication system 54 can comprise for example, one or more optical, radio frequency or other transducer circuits or other systems that convert image and other data into a form that can be conveyed to a remote device such as remote memory system 52 or remote display 56 using an optical signal, radio frequency signal or other form of signal. Communication system 54 can also be used to receive a digital image and other data from a host or server computer or network (not shown), a remote memory system 52 or a remote input 58. Communication system 54 provides processor 34 with information and instructions from signals received thereby. Typically, communication system 54 will be adapted to communicate with the remote memory system 52 by way of a communication network such as a conventional telecommunication or data transfer network such as the internet, a cellular, peer-to-peer or other form of mobile telecommunication network, a local communication network such as wired or wireless local area network or any other conventional wired or wireless data transfer system. In one useful preferred embodiment, the system 20 can provide web access services to remotely connected computer systems (e.g. remote systems 35) that access the system 20 through a web browser. Alternatively, remote system 35 can provide web services to system 20 depending on the configurations of the systems.

User input system 26 provides a way for a user of system 20 to provide instructions to processor 34. This allows such a user to make a designation of content data files to be used in generating an image-enhanced output product and to select an output form for the output product. User input system 26 can also be used for a variety of other purposes including, but not limited to, allowing a user to arrange, organize and edit content data files to be incorporated into the image-enhanced output product, to provide information about the user or audience, to provide annotation data such as voice and text data, to identify characters in the content data files, and to perform such other interactions with system 20 as will be described later.

In this regard user input system 26 can comprise any form of transducer or other device capable of receiving an input from a user and converting this input into a form that can be used by processor 34. For example, user input system 26 can comprise a touch screen input, a touch pad input, a 4-way switch, a 6-way switch, an 8-way switch, a stylus system, a trackball system, a joystick system, a voice recognition system, a gesture recognition system a keyboard, a remote control or other such systems. In the preferred embodiment shown in FIG. 9, user input system 26 includes an optional remote input 58 including a remote keyboard 58*a*, a remote mouse 58*b*, and a remote control 58*c* and a local input 68 including a local keyboard 68*a* and a local mouse 68*b*.

Remote input 58 can take a variety of forms, including, but not limited to, the remote keyboard 58*a*, remote mouse 58*b* or remote control handheld device 58*c* illustrated in FIG. 9. Similarly, local input 68 can take a variety of forms. In the preferred embodiment of FIG. 9, local display 66 and local user input 68 are shown directly connected to processor 34.

As is illustrated in FIG. 10, local user input 68 can take the form of a home computer, an editing studio, or kiosk 70 (hereafter also referred to as an "editing area 70") that can also be a remote system 35 or system 20 (FIG. 9). In this illustration, a user 72 is seated before a console including local keyboard 68*a* and mouse 68*b* and a local display 66 which is capable, for example, of displaying multimedia content. As is also illustrated in FIG. 10, editing area 70 can also have sensors 38 including, but not limited to, video sensors 39, audio sensors 74 and other sensors such as multispectral sensors that can monitor user 72.

Output system 28 (FIG. 9) is used for rendering images, text or other graphical representations. In this regard, output system 28 can include any conventional structure or system that is known for printing or recording images on output device 32 including, but not limited to, printer 29. Printer 29 can record images on a tangible surface 30 using a variety of known technologies including, but not limited to, conventional four-color offset separation printing or other contact printing, silk screening, dry electro-photography such as is used in the NexPress 2100 printer sold by Eastman Kodak Company, Rochester, N.Y., USA, thermal printing technology, drop-on-demand inkjet technology and continuous inkjet technology. For the purpose of the following discussions, printer 29 will be described as being of a type that generates color images. However, it will be appreciated that this is not necessary and that the claimed methods and apparatuses herein can be practiced with a printer 29 that prints monotone images such as black and white, grayscale, or sepia toned images. As will be readily understood by those skilled in the art, a system 20 with which a user interacts to define a user-personalized image product can be separated from a remote system (e.g. 35) connected to a printer 29, so that the specification of the image product is remote from its production.

In certain preferred embodiments, the source of content data files 24, user input system 26 and output system 28 can share components.

Processor 34 operates system 20 based upon signals from user input system 26, sensors 38, memory 40 and communication system 54. Processor 34 can include, but is not limited to, a programmable digital computer, a programmable microprocessor, a programmable logic processor, a series of electronic circuits, a series of electronic circuits reduced to the form of an integrated circuit, or a series of discrete components.

The invention has been described in detail with particular reference to certain preferred embodiments thereof, but it will be understood that variations and modifications can be effected within the spirit and scope of the invention.

PARTS LIST

E image event
12 timeline
T time interval
16 memory
18 pointers
20 system
22 housing
24 source of content data files
26 user input system
27 graphic user interface
28 output system
29 printer
30 tangible surface
32 output device
34 processor
35 remote system
38 sensors
39 video sensors
40 memory
42 hard drive
44 disk drive
46 memory card slot
48 removable memory
50 memory interface
52 remote memory system
54 communication system 56 remote display
58 remote input
58a remote keyboard
58b remote mouse
58c remote control
66 local display
68 local input
68a local keyboard
68b local mouse
70 editing area
72 user
74 audio sensors
110 data processing system
120 peripheral system
130 user interface system
140 data storage system
200 provide presentation rate and period step
205 receive slow image events step
206 receive fast image events step
210 store image events step
215 access stored image events step
216 access subset stored image events step
220 sequentially present stored image events step
221 sequentially present subset of stored image events step
225 receive new image event step
230 interrupt sequential presentation of stored image events step
235 present new image event step
240 resume sequential presentation of stored image events step

The invention claimed is:

1. A method of dynamically presenting temporally ordered image events, comprising:
   using a processor to receive at irregular intervals a plurality of temporally ordered image events;
   storing the received image events in an ordered list corresponding to the order in which the image events were received;
   accessing, according to a pre-determined rule, stored image events from the ordered list;
   when the image events are received at a rate less than a presentation rate, sequentially presenting the accessed image events for a presentation period corresponding to the presentation rate, and
   interrupting the sequential presentation of the stored image events when a new image event is received and presenting the received new image event for the presentation period and resuming the sequential presentation of the accessed image events; and
   when the image events are received at a rate greater than the presentation rate, sequentially presenting the accessed image events a first time in the order in which the accessed image events are received at a time later than the time at which the accessed image events were received when the average image rate is greater than the presentation rate.

2. The method according to claim 1, further including presenting previously-presented image events in the reverse order in which they are received.

3. The method according to claim 1, further including presenting previously-presented image events beginning with the image event prior to the most recent first-time image event presented.

4. The method according to claim 1, further including providing a flash-back time interval and presenting previously-presented image events in the order in which the previously presented image events are received beginning with the image event that is a flash-back time interval prior to the most recent first-time image event presented.

5. The method according to claim 4, wherein the flash-back time interval is the length of time since the first image event was received or the average time between image events.

6. The method according to claim 4, wherein the flash-back time interval is less than the length of time since the first image event was received.

7. The method according to claim 4, further including continuing the flash-back presentation until the image event prior to the most recent first-time image event is presented.

8. The method according to claim 4, further including interrupting the flash-back presentation with the presentation of a first-time image event.

9. The method according to claim 4, further including completing the flash-back presentation and commencing another flash-back presentation beginning with the image event that is a multiple of flash-back time intervals prior to the most recent first-time image event presented.

10. The method according to claim 1, further including receiving an image event from each of a plurality of users.

11. The method according to claim 10, wherein image events are presented to each user at a different time.

12. The method according to claim 1, wherein one or more of the image events include one or more images and the images are displayed.

13. The method according to claim 1, wherein the image events are the posting of a new image event, the receipt of a comment on a prior image event, or the receipt of an approval of a prior image event.

14. The method according to claim 1, further including removing an image event from the ordered list.

15. The method according to claim 1, further including consolidating a plurality of image events into a single image event.

16. The method according to claim 15, further including presenting consolidated information for the single image event.

17. The method according to claim 1, further including evaluating an image event for interest and removing or consolidating image events with lesser interest from the ordered list.

18. The method according to claim 1, further including modifying the presentation rate for different types of image events.

19. A non-transitory program storage device readable by one or more processors and comprising instructions stored thereon to cause the one or more processors to:
   receive at irregular intervals a plurality of temporally ordered image events;
   store the received image events in an ordered list corresponding to the order in which the image events were received;
   access, according to a pre-determined rule, stored image events from the ordered list;
   sequentially present, when the image events are received at a rate less than a presentation rate, the accessed image events for a presentation period corresponding to the presentation rate, interrupting the sequential presentation of the stored image events when a new image event is received and presenting the received new image event for the presentation period and resuming the sequential presentation of the accessed image events; and
   sequentially present, when the image events are received at a rate greater than the presentation rate, the accessed image events a first time in the order in which the accessed image events are received at a time later than the time at which the accessed image events were received when the average image rate is greater than the presentation rate.

20. A device, comprising:

a processor;

a storage memory for storing a plurality of image events; and a program memory operatively coupled to the processor and the storage memory, the program memory storing instructions configured to cause the processor to: receive temporally ordered image events at irregular intervals;

store the received image events in the storage memory in an ordered list corresponding to the order in which the image events were received;

access, according to a pre-determined rule, stored image events from the ordered list;

sequentially present, when the image events are received at a rate less than a presentation rate, the accessed image events for a presentation period corresponding to the presentation rate, interrupting the sequential presentation of the stored image events when a new image event is received and presenting the received new image event for the presentation period and resuming the sequential presentation of the accessed image events; and sequentially present, when the image events are received at a rate greater than the presentation rate, the accessed image events a first time in the order in which the accessed image events are received at a time later than the time at which the accessed image events were received when the average image rate is greater than the presentation rate.

* * * * *